United States Patent [19]
Ward et al.

[11] Patent Number: 5,185,610
[45] Date of Patent: Feb. 9, 1993

[54] GPS SYSTEM AND METHOD FOR DERIVING POINTING OR ATTITUDE FROM A SINGLE GPS RECEIVER

[75] Inventors: Phillip W. Ward, Dallas; H. Logan Scott, The Colony, both of Tex.; Jerry D. Holmes, Colorado Springs, Colo.; Leonard J. LaPadula, Carrollton, Tex.

[73] Assignee: Texas Instruments Incorporated, Dallas, Tex.

[21] Appl. No.: 569,890

[22] Filed: Aug. 20, 1990

[51] Int. Cl.$^5$ .......................... H04B 7/185; G01S 5/02
[52] U.S. Cl. .................................................. 342/357
[58] Field of Search ...................... 342/352, 357, 356; 364/449

[56] References Cited

PUBLICATIONS

Proposal to Design, Fabricate, Test, and Deliver a Navstar Global Positioning System Azimuth Determining System, Texas Instruments Incorporated, Feb. 10, 1989.
Bossler and Goad, "Using the Global Positioning System (GPS) for Geodetic Positioning", Bulletin Geodesique, pp. 553–563, 1980.
Fell, "Geodetic Positioning Using a Global Positioning System of Satellites", Reports of the Department of Geodetic Science, Report No. 299, Ref. No. DMA PE63701B/3201/240, The Ohio State University Research Foundation, Ohio, Jun. 1980.
Remondi, "Using the Global Positioning System (GPS) Phase Observable for Relative Geodesy: Modeling, Processing and Results", Center for Space Research, The University of Texas at Austin, May, 1984.
Ashkenazi, Agrotis and Yau, "GPS Interferometric Phase Algorithms", Proceedings of the First International Symposium on Precise Positioning with the Global Positioning System—Positioning with GPS, 1985, vol. 1, pp. 299–313, Apr. 15–19, 1985, Rockville, Md.
Henson, Collier and Schneider, "Geodetic Applications of the Texas Instruments TI 4100 GPS Navigator", Proceedings of the First International Symposium on Precise Positioning with the Global Positioning System—vol. 1, pp. 191–200, Apr. 15–19, 1985, Rockville, Md.
Remondi, "Performing Centimeter'Level Survey Results in Seconds with GPS Carrier Phase: Initial Results", Proceedings of the Fourth Geodetic Symposium on Satellite Positioning, vol. 2, pp. 1229–1250, Apr. 28–May 2, 1986, Austin, Texas.
Rath, "Attitude Estimation Using GPS", Texas Instruments Incorporated, paper presented at the National Technical Meeting of the Institute of Navigation, San Mateo, California, Jan. 26, 1989.
Brown, "A GPS Receiver with Built-In Precision Pointing Capability", Texas Instruments Incorporated, paper presented at the IEEE Position Location and Navigation Symposium (Plans '90), Las Vegas, Nevada, Mar. 20, 1990.

Primary Examiner—Theodore M. Blum
Attorney, Agent, or Firm—René E. Grossman; Richard L. Donaldson

[57] ABSTRACT

A GPS single-receiver pointing/attitude system derives pointing/attitude measurements by correlating a selected GPS code (either P or C/A), recovered from GPS navigation signals using a single GPS receiver with multiple GPS antennas (a reference antenna and at least two slave antennas for pointing or three for attitude). For a two antenna pointing application, the GPS receiver (FIG. 4) includes, for each receiver channel, the incoming GPS signals are applied to three code correlators (72–75) assigned to the reference antenna, and three code correlators (76–77) assigned to the slave antenna, which provide corresponding reference and slave I and Q correlation outputs. The single-receiver pointing technique involves: (a) using the reference I and Q correlation outputs to establish a conventional reference antenna tracking loop; and (b) processing the reference and slave I and Q correlation outputs (using differential carrier doppler phase or code phase measurements) to determine phase differences from which pointing can be computed.

40 Claims, 8 Drawing Sheets

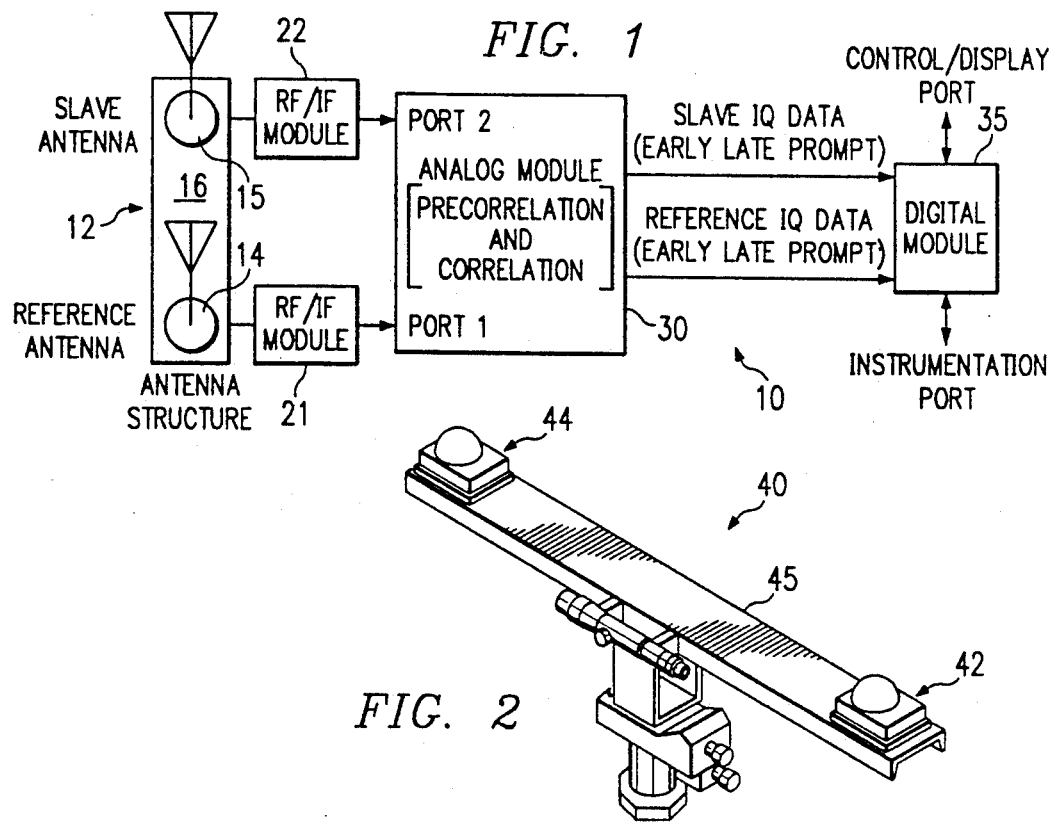
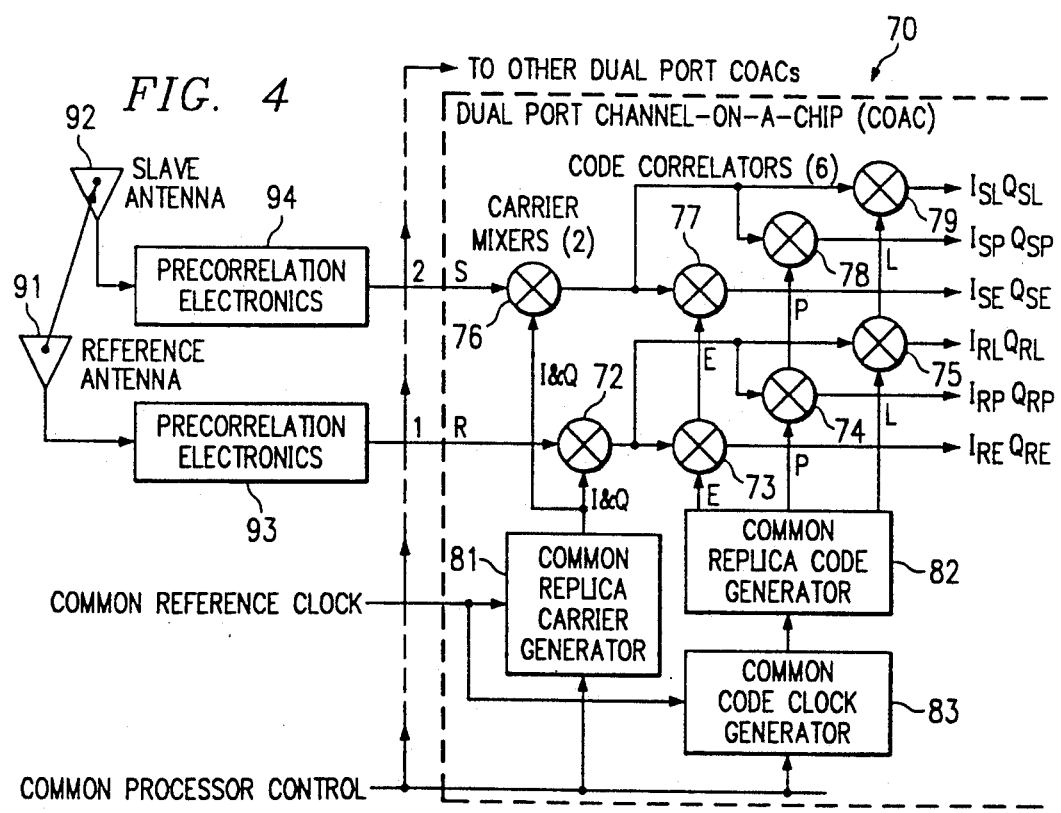

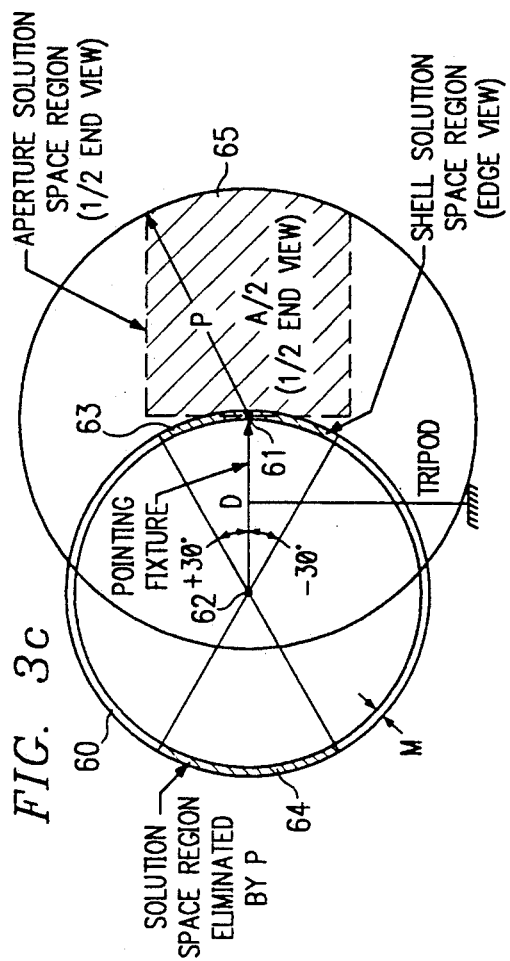
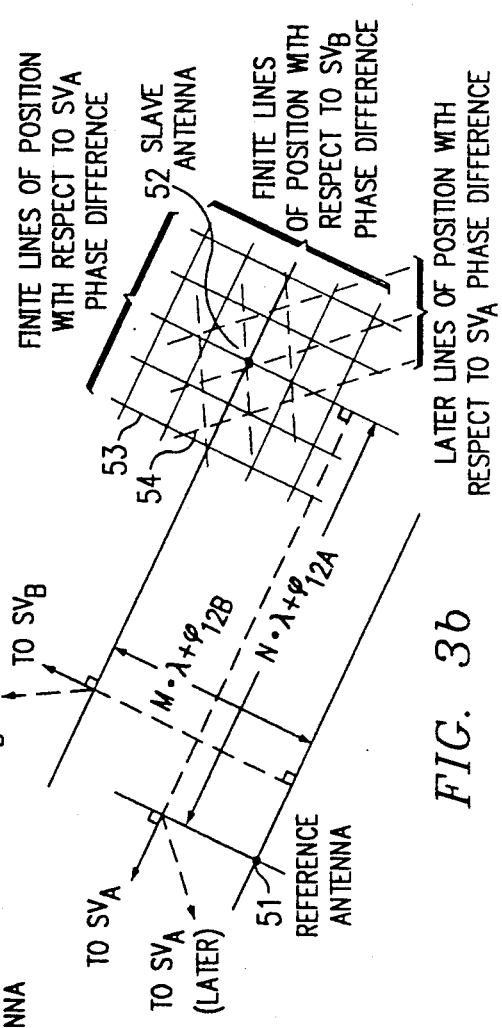
FIG. 3c
FIG. 3b
FIG. 3a

GPS SYSTEM AND METHOD FOR DERIVING POINTING OR ATTITUDE FROM A SINGLE GPS RECEIVER

TECHNICAL FIELD OF THE INVENTION

The invention relates generally to NAVSTAR Global Positioning Systems (GPS), and more particularly relates to such a GPS system and method for deriving precise pointing or attitude measurements using a single GPS receiver and a multiplicity of antennas (at least two for pointing, and at least three for attitude).

BACKGROUND OF THE INVENTION

The NAVSTAR Global Positioning System (GPS) is a Department of Defense satellite navigation system that uses a constellation of GPS navigation satellites in a space segment (SS) to transmit GPS signals and data from which a world wide User Segment (US) can derive accurate position, velocity and time.

A GPS Control Segment on the ground tracks the SS satellite constellation, and uplinks to each GPS satellite ephemeris data on its orbital characteristics and satellite clock correction parameters to precisely synchronize the on-board satellite atomic clock with reference to GPS system time. Each GPS satellite continually transmits a navigation signal that provides navigation message data—including time of transmission, satellite clock correction parameters and ephemeris data.

The navigation signal is transmitted over two carrier frequencies in the L band (L1 at 1575.42 and L2 at 1227.6 MHz), spread spectrum modulated with two pseudo random noise (PRN) codes: (a) a P-code (precision) with a seven day period (repeating its PRN sequence only once every seven days), providing for precision measurement of time, and (b) a C/A-code (clear/access or coarse/acquisition) with a one millisecond period, providing for rapid search and acquisition of the navigation signal from a given satellite (and handoff to the more precise but harder to acquire P-code). Both L1 and L2 are modulated with the P-code (10.23 MHz), while only L1 carries the C/A-code (1.023 MHz), and each code modulation is further modulated with the 50 Hz navigation message data.

The problem to which the invention is directed is the design of an economic and high precision system of GPS measurements to permit accurate computation of pointing (azimuth and elevation) or attitude (roll, pitch/elevation and yaw/azimuth). More specifically, the design problem is to economically eliminate or control the distributed error sources that are typically encountered in GPS receivers, achieving precise performance necessary for accurate GPS pointing/attitude, in addition to the normal position, velocity and time computations. These error sources include satellite clock, satellite electrical path, receiver oscillator, code and carrier generators, receiver electrical path, receiver time bias error, satellite clock prediction, ephemeris radial prediction, ionospheric and other atmospheric signal paths.

For conventional GPS navigation (position and velocity in three dimensions), a User Segment GPS receiver tracks four GPS satellites, establishing synchronism with its navigation signal, and recovering the navigation message data. Ranges to the four satellites are determined by scaling the signal transit time by the speed of light, with the position of each satellite at the time of transmission being determined from the associated ephemeris parameters.

The need for a GPS receiver to include a precision clock (synchronized to GPS system time) is eliminated by the use of range measurements from four satellites. That is, the navigation problem for position is characterized by four unknowns—position in three dimensions and clock error (or fixed time bias)—requiring four user position equations to provide three estimated position coordinates and an estimate of the receiver time bias. In addition, velocity measurements are made by measuring the doppler shift in the carrier frequency of the navigation signal, with the error offset in the frequency of the receiver oscillator being compensated for by using four range rate (doppler) equations.

From each satellite, the GPS receiver is able to provide pseudo range and range rate (doppler) measurements that can be used for position and velocity computations. Pseudo range is the range measurement, with respect to the receiver clock, to any satellite being tracked based on signal transit time and satellite position before compensating for the fixed receiver time bias associated with any range measurement.

For GPS pointing applications, such as precision geodetic surveying, GPS interferometry techniques are used to define to a high degree of precision a baseline vector between a reference antenna (at a known location) and a second antenna (at an unknown location)—typically, this vector can be defined within a millimeter for relatively short baselines. The vector includes both the distance and the direction (azimuth and elevation) to the second antenna with respect to the reference antenna. Using this vector, the precise geodetic position of the unknown antenna can be computed by adding (in the same coordinate system) the measured vector to the known geodetic position of the reference antenna.

GPS interferometry uses differentially-processed carrier doppler phase measurements for the two locations to provide first order positioning of the second GPS receiver/antenna location—more precisely, the antenna phase center location—with respect to the reference GPS receiver/antenna location (References 1, 2 and 3, listed at the end of the Background). This technique can be extended to obtain attitude information using differential carrier doppler phase measurements for two GPS receivers/antennas at unknown locations arranged in a triangular pattern with respect to the reference antenna—the two measured vectors determine a plane characterized by roll, pitch and yaw.

In any GPS receiver design, tracking a GPS satellite requires synchronization with and demodulation of the carrier and PRN codes from the GPS navigation signals—a correlation process establishes carrier and code tracking loops that align selected GPS carrier and code (P or C/A) signals with corresponding replica carrier and code signals generated within the GPS receiver. In particular, the receiver measures apparent (pseudo range) transit time by measuring the phase shift between the GPS code signal and the receiver replica code signal—the receiver replica code is shifted until maximum correlation (within the error tolerance of the carrier and code tracking loops) is achieved between it and the received GPS code, with the time magnitude of the shift corresponding to measured pseudo range.

This tracking process of maintaining correlation between the P- or C/A-codes recovered from a selected incoming GPS navigation signal, and the corresponding receiver replica code, is a closed loop. For each GPS satellite being tracked, the selected GPS code/carrier signals are fed into the GPS inputs of the tracking channel's code and carrier correlators, while the replica inputs receive the receiver generated replica code and carrier. The resulting correlator outputs are split into in-phase (I) and quadrature (Q) signals, which are combined into code and carrier error signals. These error signals are fed into code and carrier tracking loop filters to generate corrections to the replica code and carrier generators, the corrected outputs of which are fed back to the code and carrier correlators as a closed loop.

The replica state for the tracking receiver changes as a function of two effects: (a) a time effect due to the signal state rate of change within the satellite as a function of time, and (b) a position effect due to the physical separation between the satellite and the receiver antenna. The physical separation between the satellite and the antenna is, in general, constantly changing due to the satellite orbital motion and, in the case of a dynamic user, due to the antenna motion, thereby producing a doppler effect on the code and carrier signals which is proportional to the net line of sight relative motion between the GPS antenna and the satellite antenna.

For a pointing application, if multiple GPS receiver/antennas are at fixed locations, or are rigidly attached to a single platform (such as on either end of a rigid beam), differential measurements can be made for the multiple antennas with respect to a single satellite. This differential measurement process eliminates the time effect (attributable to the satellite), so that only the relative position effect (attributable to the multiple antennas) remains. Measuring and processing relative position measurements yields the desired pointing vector (at least two antennas) or attitude vectors (at least three non-linear antennas).

This differential process for measuring relative position is commonly referred to as differential carrier doppler phase measurement. Differential carrier doppler phase measurement is not to be confused with range rate (doppler) measurements used for velocity computations—conventional range rate computations use fairly coarse doppler measurements that do not require precise measurement of the phase difference between the doppler shifted GPS signals arriving at different antennas. In contrast, to achieve significant pointing/ attitude accuracy, differential carrier doppler phase measurement must provide a highly precise measure of carrier phase difference with respect to the signals arriving at the different antennas.

Using separated GPS receivers for differential carrier doppler phase measurements inherently introduces differential receiver error sources that impact the precision of those measurements, and therefore, the pointing/attitude computations that use those measurements. These error sources include satellite clock errors, satellite electrical path errors, receiver clock errors, receiver electrical path errors, oscillator noise, code and carrier generator noise, time bias error in the range measurements, satellite clock prediction errors, ephemeris radial prediction errors and ionospheric errors. Several GPS processing techniques have been developed to eliminate the sources of receiver error caused by the introduction of separated GPS receivers (See references 4, 5, 6, listed at the end of the Background).

If analog multichannel GPS receivers are used, another significant error source is interchannel bias error—even if calibrated, interchannel bias changes as a function of both time and temperature. In current digital multichannel GPS receivers with precorrelation analog-to-digital conversion, the analog GPS signals from different satellites pass through a common analog RF/IF front-end, and are delayed by the same amount, producing a common interchannel bias because the analog circuit is common to all GPS signals. The differential digital signal delay paths can be precisely matched and are highly stable over time and temperature, so that the common interchannel bias is eliminated when the outputs attributable to different satellites (i.e., in different channels) are subtracted from each other in the pointing and attitude measurement process.

Even if these error sources can be eliminated or counteracted, three additional error sources significantly impact differential carrier doppler phase measurements used in pointing/attitude: (a) antenna differential phase center migration, (b) differential multipath, and (c) thermal noise.

An ideal GPS receiver antenna navigates the phase center of the GPS antenna when absolute positioning is performed because, ideally, all delay paths between the antenna phase center and the receiver correlators are equal and therefore cancel in the differential measurement process. However, in practice, the location of any GPS antenna phase center migrates as a function of the elevation and azimuth angle of each GPS satellite being tracked because of changes in the antenna gain and phase response at varying angles are not equal. These antenna phase center migration errors can be minimized by using phase matched antennas oriented in the same direction, such that any resulting errors cancel when the signals are differentiated.

Multipath errors arise because the direct-path GPS signal arrival is corrupted by associated multipath signals that arrive slightly later after reflecting from nearby reflecting surfaces. A significant source of multipath reflections is the location of reflecting surfaces near or below the horizon view of the GPS antenna. These multipath reflections can be minimized by antenna designs whose gain near and below the horizon is sufficiently low to reject multipath signals.

The precision of the differential carrier doppler phase measurements is ultimately limited by thermal noise, which is accurately predictable from the strength of the GPS signal, the noise figure of the receiver, and the bandwidth of the tracking loops. Thus the goal of GPS receiver design is to reduce the remaining sources of measurement error (including phase center migration and multipath) so as to be small compared with the thermal noise. In the case of the differential carrier doppler phase measurements used in pointing/attitude applications, an appropriate design goal is to make these error sources small compared to one degree of a carrier cycle at L-band—for the GPS L1 carrier at 1575.42 MHz, this corresponds to 0.5286 millimeters, and for the L2 carrier at 1227.6 MHz, this corresponds to 0.6784 millimeters.

Accordingly, a need exists for an economical GPS system that permits precise pointing or attitude measurements by eliminating or controlling distributed error sources.

REFERENCES

1. Bossler, J. D., and C. C. Goad, "Using the Global Positioning System (GPS) for Geodetic Positioning", *Bulletin Geodesique*, pages 553–563, 1980.
2. Fell. P. J. "Geodetic Positioning Using a Global Positioning System of Satellites", *Reports of the De-* partment of Geodetic Science, Report No. 299, Reference No. DMA PE63701B/3201/240, The Ohio State University Research Foundation, Ohio, Jun., 1980.
3. Remondi, B. W. "Using the Global Positioning System (GPS) Phase Observable for Relative Geodesy: Modeling, Processing, and Results", Center for Space Research, The University of Texas at Austin, May, 1984.
4. Ashkenazi, V., L. G. Agrotis, and J. H. Yau, "GPS Interferometric Phase Algorithms", *Proceedings of the First International Symposium on Precise Positioning with the Global Positioning System—Positioning with GPS—1985*, Vol 1, pages 299-313 Apr. 15-19, 1985, Rockville, Md.
5. Henson, D. J., E. A. Collier, and K. R. Schneider, "Geodetic Applications of the Texas Instruments TI4100 GPS Navigator", *Proceedings of the First International Symposium on Precise Positioning with the Global Positioning System—Positioning with GPS—1985*, Vol. 1, pages 191-200, Apr. 15-19, 1985, Rockville, Md.
6. Remondi, B. W., "Performing Centimeter Level Survey Results in Seconds with GPS Carrier Phase: Initial Results", *Proceedings of the Fourth Geodetic Symposium on Satellite Positioning*, Vol. 2, pages 1229-1250, Apr. 28-May 2, 1986, Austin, Tex.

SUMMARY OF THE INVENTION

The invention is a GPS single-receiver pointing/attitude system and method for deriving pointing/attitude measurements using multiple GPS antennas but only a single GPS receiver.

For pointing (azimuth and elevation), the minimum configuration is two GPS antennas attached to a rigid beam (or other foundation). For attitude (roll, pitch/elevation and yaw/azimuth), the minimum configuration is three GPS antennas arranged in a triangular pattern and attached to a rigid platform (or other foundation). In either case, for this invention, the spatial distance between antennas must be well within the correlation interval for the selected PRN code (plus/minus 29.3 meters for P-code, and plus/minus 293 meters for C/A-code). The invention includes all oversolution applications (i.e., more than two antennas arranged in line for pointing, more than three antennas arranged in a plane for attitude, and more than the minimum number of GPS satellites) to improve performance.

In one aspect of the invention, the GPS single-receiver pointing/attitude system derives pointing/attitude measurements from selected GPS carrier and PRN code (either P or C/A) signals recovered from GPS navigation signals. The system includes multiple antennas coupled to a single GPS receiver.

The antennas—a reference antenna and at least one slave antenna—are configured in a fixed spatial relationship, such that antenna separation is significantly less than the correlation interval for the selected PRN code.

The GPS receiver includes (a) reference precorrelation and correlation electronics, and (b) for each slave antenna, slave precorrelation and correlation electronics. In addition, the GPS receiver includes at least one replica carrier generator for generating a replica of the selected carrier signal, and at least one replica PRN code generator for generating a replica of the selected PRN code signal.

The reference and slave precorrelation electronics provide respective reference and slave digital representations of the GPS signal received by the reference and slave antennas from a selected satellite. The digital reference and slave GPS signals are respectively coupled to the reference and slave correlation electronics.

The reference correlation electronics includes a carrier mixer and a selected number of code correlators, which are responsive to (a) the reference GPS signals, and (b) replica carrier and replica code signals, for providing reference in-phase (I) and quadrature (Q) correlation outputs. The slave correlation electronics includes a carrier mixer and at least one code correlator, which are responsive to (a) the slave GPS signals, and (b) replica carrier and replica code signals, for providing slave I and Q correlation outputs.

A GPS processor is responsive to (a) the reference I and Q correlation outputs for tracking the selected satellite with the reference antenna (the slave antenna need not be tracked), and (b) the reference I and Q correlation outputs and the slave I and Q correlation outputs, which are phase shifted in proportion to the displacement (pointing) of the slave antenna with respect to the tracked reference antenna, for computing pointing/attitude measurements.

Thus, the single-receiver pointing technique involves: (a) establishing a conventional reference antenna tracking loop to obtain reference I and Q correlation outputs from a set of reference code correlators assigned to the reference antenna, (b) generating slave I and Q correlation outputs from at least one slave correlator assigned to the slave antenna; and (c) processing the reference and slave I and Q signals (using differential carrier doppler phase or code phase measurements) to determine phase differences from which pointing can be computed.

In more specific aspects of the invention, the reference correlation electronics can include Early, Prompt (or On-time) and Late (EPL) code correlators, while the slave correlation electronics can be implemented using only a Prompt code correlator. Pointing/attitude measurements are based on computations of carrier phase differences between the reference antenna and the slave antenna according to the relationship:

$$\text{TAN}^{-1}((I_{RP}{}^*Q_{SP} - Q_{RP}{}^*I_{SP})/(I_{RP}{}^*I_{SP} + Q_{RP}{}^*Q_{SP}))$$

where $I_{RP}$ and $Q_{RP}$ are respectively in-phase and quadrature Prompt correlator outputs for the reference antenna, and $I_{SP}$ and $Q_{SP}$ are respectively in-phase and quadrature slave prompt correlator outputs for the slave antenna. A reference antenna tracking loop is established using the EPL I and Q outputs from the reference code correlators, while the above carrier phase difference computation only requires the Prompt I and Q outputs from both the reference and slave correlators. Preferably, a single set of replica carrier and code generators is used in common for both the reference and slave antenna signals.

As an alternative to using differential carrier doppler phase measurements for pointing/attitude computations, the reference and slave I and Q correlation outputs can be used to compute reference/slave code phase difference measurements.

For GPS receivers in which each channel includes extra correlators (i.e., in addition to the EPL correlators typically used for tracking), the slave correlation electronics can be implemented using at least one of the extra correlators. In this implementation, the only additional hardware required is a mixer for each slave antenna. During search, all correlators can be used in a conventional manner to expedite acquisition. Once satellite lock is acquired, a conventional tracking loop is established for the reference antenna using the EPL I and Q outputs from the tracking correlators. The now-idle extra code correlator(s) can be coupled to receive the GPS signal from the slave antenna, through the slave mixer, along with an appropriate replica code—for the above carrier phase difference computation, at least the Prompt replica code would be used to provide Prompt I and Q outputs from a designated slave code correlator.

The technical advantages of the invention include the following. The single-receiver GPS design provides a method of GPS signal demodulation and measurement that is both economical (high commonality of hardware) and precise (elimination or control of distributed error sources likely to be encountered when using separate GPS receivers), permitting a highly accurate computation of pointing and attitude. The GPS single-receiver pointing/attitude system can be used in conjunction with an inertial guidance system, providing not only pointing/attitude measurements, but also an accurate source of calibration measurements, thereby allowing lower cost inertial guidance systems to be used.

The receiver tracks a reference antenna using conventional correlation hardware, adding for each slave antenna only an additional mixer and an additional code correlator (or correlators) to produce in-phase I and quadrature Q outputs for the slave antenna(s)—these slave I and Q outputs are phase shifted in proportion to the absolute displacement (pointing) of the slave antenna(s) with respect to the reference antenna, and can be used for pointing or attitude measurements. A common set of replica carrier and code generators can be used to minimize hardware duplication. Either P-code or C/A-code signals may be used for both tracking and pointing/attitude measurements.

The reference I and Q and slave I and Q outputs from the associated code correlators are processed differentially, minimizing common mode receiver error in the GPS observables, such as oscillator noise, code and carrier generator noise, and time bias error, such that the receiver error is largely characterized by thermal noise (which can be predicted). Pointing/attitude computations can be based on either differential carrier doppler phase measurements, or on code phase difference measurements.

Information available in the differential carrier doppler phase measurements can be used to solve for the precise antenna phase center separation (rather than relying on the initial a priori measurement of the antenna baseline), providing an accurate estimate of the antenna baseline separation which, in turn, improves the pointing or attitude measurement accuracy. In addition, an index can be added at precisely the same physical location on each of the multiple and identical GPS antennas (reference and all slaves), and used to orient the antennas identically on a platform, minimizing differential phase center migration which reduces the error contribution by the GPS antennas.

BRIEF DESCRIPTION OF THE DRAWINGS

FIG. 1 illustrates an exemplary GPS antenna/receiver configuration of the single-receiver pointing system of the invention;

FIG. 2 illustrates an exemplary antenna structure for the GPS single-receiver pointing system;

FIGS. 3a–3c illustrate the phase difference relationship for GPS navigation signals received by reference and slave antennas from two GPS satellites, including illustrating the ambiguity problem caused by path differences that include an unknown integer number (M and N) of wavelengths in addition to the precisely measured phase difference within one wavelength;

FIG. 4 illustrates an exemplary precorrelation and correlation electronics block diagram for the GPS single receiver pointing system;

DETAILED DESCRIPTION OF THE INVENTION

Figure 5:
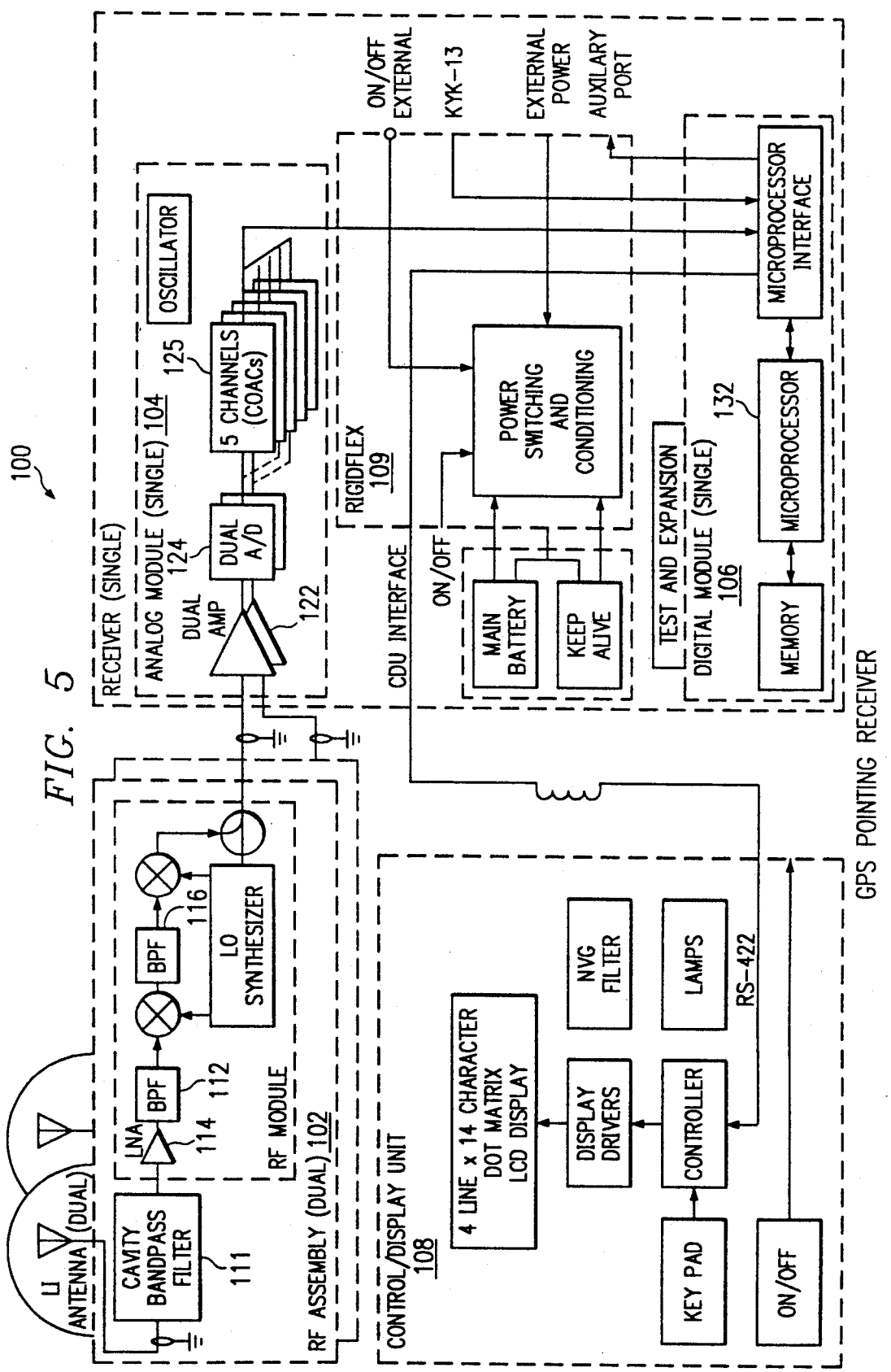
FIG. 5 illustrates in functional block diagrams the RF, Analog, Digital, and Control/Display modules for an exemplary GPS single-receiver pointing system.

The Detailed Description of an exemplary embodiment of the GPS single-receiver pointing/attitude system of the invention is organized as follows:
1. GPS Single-Receiver Pointing Embodiment
2. Differential Carrier Doppler Phase
   2.1. GPS Interferometry
   2.2. Ambiguity Resolution
   2.3. Computing the Pointing Vector
3. Single-Receiver Pointing Technique
   3.1. Reference/Slave Correlation
   3.2. Carrier Phase Difference Measurement
   3.3. Code Offset Coarse Measurement
   3.4. Pointing Observables
   3.5. Error Sources
4. Exemplary GPS Receiver
   4.1. Antennas
   4.2. RF Assembly
   4.3. Analog Module
   4.4. Digital Module
   4.5. Software
5. Conclusion The exemplary embodiment of the invention is described in relation to a GPS single-receiver pointing system for deriving precise pointing measurements using two antennas (reference and slave) mounted to a rigid beam. This Detailed Description can be routinely extended to a GPS single-receiver attitude embodiment by providing a reference and at least two slave antennas mounted on a platform that defines a plane. In addition, the Detailed Description can be routinely extended to oversolution pointing embodiments with more than two slave antennas mounted co-linearly with the reference antenna to a beam, and to oversolution attitude embodiments with more than three antennas mounted on a platform, thereby improving performance through redundancy.

1. GPS Single Receiver Pointing Embodiment. The exemplary GPS single-receiver pointing embodiment of the invention is illustrated generally in FIGS. 1 and 2

Referring to FIG. 1, the GPS single-receiver pointing embodiment 10 includes an antenna structure 12 with two GPS antennas 14 and 15 mounted to a rigid beam 16. Antenna 14 is designated the reference antenna, and antenna 15 is designated the slave antenna.

The reference and slave antennas 14 and 15 should be proximate in that antenna separation should be significantly less than the correlation interval for the selected PRN code signal—58.6 meters for P-code, or 586 meters for C/A-code. An appropriate antenna separation would be 5 meters or less.

GPS navigation signals (Carrier, PRN Code and Navigation Message Data) are received by GPS antennas 14 and 15, and applied to RF/IF modules 21 and 22, which provide the L-band down conversion portion of the precorrelation electronics for both antenna signals.

An Analog module 30 receives the reference and slave IF GPS navigation signals into respective Ports 1 and 2. The Analog module provides the signal conditioning and analog-to-digital conversion for both ports, which completes the precorrelation electronics, and includes separate correlation electronics for the received reference and slave IF GPS navigation signals.

The reference and slave precorrelation electronics convert the corresponding analog GPS navigation signals to digital signals that are input to the correlation electronics. The reference and slave correlation electronics generates replica code and carrier signals, and include the mixers and code correlators that provide the in-phase I and quadrature Q outputs for the code and carrier loops.

A Digital module 35 receives the reference and slave I and Q correlator outputs (Early, Late and Prompt), and implements (a) conventional reference receiver tracking, and (b) differential carrier doppler phase processing to obtain pointing measurements according to the invention. For reference receiver tracking, the reference correlation electronics and the Digital module establish a conventional GPS satellite tracking loop using the GPS navigation signals received from a selected satellite by the reference receiver—the slave antenna need not be tracked to compute pointing/attitude according to the invention.

For the exemplary GPS single-receiver pointing embodiment, the digital module processes the Prompt I and Q outputs from the reference and the slave code correlators to measure the phase difference between the GPS navigation signals received by the reference and slave antennas from a selected satellite (see, Section 3). The Digital module then computes pointing using conventional differential carrier doppler phase processing.

For attitude determinations, the GPS receiver can be configured with an additional GPS antenna, associated precorrelation electronics and an additional port to the correlation electronics.

FIG. 2 illustrates an exemplary antenna structure 40, that includes reference and slave antennas 42 and 44 mounted on a rigid beam 45, separated by about one meter. The antenna structure can be configured for mounting on a tripod or vehicle.

2. Differential Carrier Doppler Phase. The GPS single-receiver pointing/attitude system of the invention implements conventional differential carrier doppler phase processing techniques used in GPS interferometry, including processing techniques for eliminating receiver error sources (referenced in the Background).

These error processing techniques have been developed in the context of geodetic surveying using widely separated GPS receiver/antennas, but also apply to the closely spaced reference and slave GPS antennas 14 and 15 mounted at the ends of the beam 16. As with geodetic surveying, pointing involves determining the azimuth and elevation angles for the baseline pointing vector established between the phase centers for the reference and slave antennas.

In contrast to geodetic applications using a reference antenna/receiver (known location) and a slave antenna/receiver (unknown location), for pointing applications using the GPS single-receiver pointing embodiment 10, the separation between the reference and slave antennas 14 and 15, i.e., the magnitude of the baseline vector, is known a priori fairly precisely because they are rigidly mounted and move together. However, the pointing angle of the baseline pointing vector defined by the direction of the beam in azimuth and elevation is unknown, and typically changing.

2.1. GPS Interferometry. The same vector computation techniques used in geodetic applications are used to determine the relative direction from the reference antenna to the slave antennas 14 and 15, and therefore, the desired pointing vector.

That is, conventional geometric principles establish the pointing angle for the line defined by the physical arrangements of the reference and slave antennas, and conventional GPS interferometry principles provide the differential carrier doppler phase measurement techniques for computing that pointing angle. In particular, the single-receiver GPS pointing technique of the invention uses these GPS interferometric principles to compute pointing from carrier doppler phase observables.

Geodetic interferometry techniques for pointing can be based on the differential processing of either (a) pseudo range observables alone, or (b) a combination of pseudo range and carrier doppler phase observables.

In dynamic point positioning, differential processing is applied to pseudo range observables, yielding a relative accuracy for the pointing vector of about 1 to 3 meters with the smoothing provided by a one second time constant filter (which can be improved with longer time averaging). With interferometry techniques, the continuously counted carrier doppler phase observables are also used, resulting in a differential accuracy for the same smoothing time constant of about 1 to 3 millimeters, which is about three orders of magnitude more accurate than dynamic point positioning.

2.2. Ambiguity Resolution. GPS interferometric techniques involve ambiguity in the solution space for the carrier doppler phase measurements, which must be resolved. Specifically, the carrier doppler phase measurement repeats every wavelength of the GPS carrier frequency, which is about 19 centimeters for L1.

Thus, the actual path difference for the reference and slave antennas to a selected satellite will be the distance corresponding to the precisely measured phase difference plus an unknown integer number of wavelengths. As a result, a number of path-difference solutions exist within the uncertainty region, creating an ambiguity problem at every integer wavelength. Dynamic point positioning may be useful in reducing the solution space derived from interferometric techniques.

FIG. 3a illustrates the ambiguity problem in the context of an antenna structure 50, such as used in the GPS single-receiver pointing embodiment, with reference and slave antennas 51 and 52. The effect of taking phase difference measurements between reference and slave antennas 51 and 52 and satellite vehicles A and B is an ambiguity of N wavelengths for satellite A, and an ambiguity of M wavelengths for satellite B. The conventional solution for resolving this integer wavelength ambiguity can be summarized as follows.

First, the solution space of the slave antenna relative to the reference antenna can be narrowed down to the relatively small region of uncertainty provided by dynamic point positioning, which is unambiguous. Next, all possible carrier doppler phase solutions are computed within this uncertainty region, i.e., various integer cycle counts are tried with each set of measurements to first determine if they produce a feasible solution, and then to determine if it resides within the solution space.

FIG. 3b illustrates the solution space for the slave antenna 52 relative to the reference antenna 51, represented at an initial time by the solid line grid 53 and at a later time by a dashed line grid 54. A histogram of possible solutions is maintained. Since false solutions migrate as the satellites move with respect to the benchmarks, the histogram containing the true solution will build up faster than all the others, eventually reaching a solution threshold.

Solving the ambiguity problem for the GPS single-receiver pointing embodiment in which the reference and slave antennas are mounted on an antenna structure 50 is facilitated by a priori information and boundary conditions. Moreover, because the data is taken from both antennas and processed in real time, an operator can be informed whether the ambiguity problem has been solved, and can even assist in the process.

FIG. 3c illustrates that the solution space 60 for the slave antenna phase center 61 is limited to a thin spherical shell 60 around the reference antenna phase center 62. The nominal radius of the sphere is the nominal antenna phase center separation of the antennas when rigidly mounted to the pointing fixture. The thickness of the shell corresponds to the maximum differential phase center migration of the phase matched antennas.

The solution space shell 60 is bounded by the limitation that the pointing vector will lie within segments 63 and 64 defined by the (typical) 30 degree boundary above and below the local level, designated the spherical ring segment for the reference antenna. Dynamic point positioning using the unambiguous, but noisy, differential pseudo range observables can provide an additional boundary condition that limits the solution space to the spherical ring segment 63, within a spherical aperture 65. This additional boundary condition may or may not be useful depending on how noisy the differential pseudo range measurements are, and how closely the antennas are spaced.

With these boundary conditions imposed, the number of ambiguous solutions within the spherical aperture 50 can be minimized. These ambiguities can either be solved by waiting for the satellites to move (as is required for the geodetic solution) or by slowly rotating the pointing vector by some arbitrary amount, but in a manner such that the receiver does not lose phase lock. The rotation will cause the false solutions to migrate out of the relocated spherical aperture.

This technique for solving the ambiguity problem is exemplary—several other approaches can be used. External sensor aiding, such as an instrumented inclinometer and a flux gate magnetometer, can be used to restrict the pointing vector boundary conditions even further, thereby reducing the convergence region to essentially one solution. The convergence time is reduced to the pointing computation and smoothing time after the receiver's first navigation fix.

Secondly, an additional slave antenna can be placed closer to the reference antenna than to the original slave antenna (asymmetrically located). By rapidly switching (multiplexing) the slave port of the receiver between the two slave antennas, two sets of interferometric patterns are produced. This approach produces two different sized spherical aperture regions of solution in which both must contain the same pointing vector solution, but solution convergence involves considerable software complexity and the expense of an extra RF module plus the antenna switching circuit.

Thirdly, a P-Code receiver can be used to track both L1 and L2 frequencies, producing two different standing wave patterns for which fewer solutions will fit both simultaneously. This approach is similar to the second alternative approach, but uses the dual frequency capability of the GPS satellites rather than an additional antenna.

2.3. Computing the Pointing Vector. Once the ambiguity problem is solved, the pointing vector can be computed using the carrier doppler phase difference measurement provided by the GPS single-receiver pointing technique of the invention (Section 3). Such pointing vector processing can be accomplished using conventional GPS pointing techniques.

For example, "Attitude Estimation Using GPS," Rath, J. and Ward, P., *Proceedings from the National Technical Meeting of the Institute of Navigation* (San Mateo, Calif. Jan. 26, 1989), provides a detailed geometrical description of the pointing vector. It describes the rationale for taking single, then double differences of the pointing observables. The three equations in three unknowns required to solve for the pointing vector are developed in terms of the double path difference measurements.

This deterministic method of solving for the pointing vector is used while solving the ambiguity problem. Thereafter, a Kalman filter is used to estimate the azimuth and elevation with the oversolution that is available when tracking more than four GPS satellites.

3. Single-Receiver Pointing Technique. The single-receiver pointing technique of the invention measures the phase difference between the GPS navigation signal arriving at the reference and slave antennas. When combined with the integer wavelength solution derived from resolving the ambiguity problem (Section 2.2), this phase difference measurement can be used to compute the pointing vector established by the reference and slave antennas.

The single-receiver pointing technique involves: (a) establishing a conventional reference tracking loop to obtain reference I and Q correlation outputs from a set of reference code correlators assigned to the reference antenna, (b) generating slave I and Q correlation outputs from at least one slave correlator assigned to the slave antenna; and (c) processing the reference and slave I and Q signals (using differential carrier doppler or code phase measurements) to determine phase differences from which pointing can be computed.

3.1 Reference/Slave Correlation. For the exemplary GPS single-receiver pointing embodiment, an exemplary multichannel GPS receiver includes five dual port channels for simultaneously tracking five GPS satellites. Each channel includes two carrier mixers and six code correlators—one carrier mixer and three of the code correlators are used for conventional GPS tracking, while the extra three correlators are connected to the reference antenna input signal and used during search to expedite acquisition (these are normally idle during tracking).

FIG. 4 provides a functional illustration of one such dual port channel 70, showing both reference and slave correlation electronics configured for both tracking and pointing. The reference and slave designations reflect the functional configuration of the channel during pointing operation (i.e., after tracking has been established).

The reference correlation electronics in channel 70 include a reference carrier mixer 72, and three reference code correlators—Early 73, Prompt (or On-time) 74 and Late 75—for the selected PRN code. The reference correlation electronics provides corresponding reference I and Q correlation outputs used to establish the tracking loop for tracking the reference antenna.

The slave correlation electronics in channel 70 include a slave carrier mixer 76, and three slave code correlators—Early 77, Prompt 78 and Late 79—for the selected PRN code. The slave correlation electronics provides corresponding slave I and Q correlation outputs used for pointing computations according to the invention.

The reference and slave correlation electronics can be configured to use either P-code or C/A-code. A receiver design based on C/A-code will be less expensive, while better performance (higher pointing accuracy) can be expected from a more sophisticated receiver capable of using P-code, particularly where minimizing multipath errors is especially important (see Section 3.5). Thus, the choice of a PRN code involves a relatively straightforward design choice between cost and performance.

Channel 70 also includes a common replica carrier generator 81 and a common replica code generator 82, which is clocked by a common code clock generator 83. Both the replica carrier generator and the replica code clock generator are referenced to a common reference clock. Thus, the common set of replica carrier and code generators, and the common oscillator (clock) are shared with the dual port mixer and correlators. Alternatively, dedicated replica carrier and code generators can be used with a common clock, with one set being assigned to the reference antenna signal and the other set(s) being assigned to the slave antenna signal(s).

Because the mixers and correlators are digital, they do not require much additional circuitry to duplicate, especially when implemented on an application specific integrated circuit (ASIC).

A GPS navigation signal is received by a reference antenna 91 and a slave antenna 92, which establish a pointing vector. As indicated earlier, antenna separation should be small in comparison to the correlation interval for the selected PRN code.

The reference GPS signal is applied through reference precorrelation electronics 93 to Port i of channel 70, and thence to the reference correlation electronics. The slave GPS signal is applied through slave precorrelation electronics 94 to Port 2 of channel 70, and thence to the slave correlation electronics. In conventional digital GPS receiver designs, precorrelation electronics provide preamplification, downconversion of the L-band GPS navigation signal to an IF, and analog-to-digital conversion at that IF.

In operation, the (digital) reference GPS signal feeds the reference carrier mixer 72, and the (digital) slave GPS signal feeds the slave carrier mixer 76. The common replica carrier generator 81 produces a complex I and Q signal that feeds both the reference and the slave carrier mixers.

The complex I and Q outputs from the reference carrier mixer feed all three reference code correlators 73, 74 and 75. Similarly, the complex I and Q outputs from the slave carrier mixer feed all three slave code correlators 77, 78 and 79.

The common replica code generator 82 feeds the three reference code correlators and the three slave code correlators with an Early (E), Prompt (P) and Late (L) replica code (which are phased half a chip apart) for the selected PRN code.

The code correlation process produces three corresponding complex I and Q correlation outputs from the reference and the slave code correlators. The reference I and Q correlation outputs—designated $I_{RL}/Q_{RL}$, $I_{RP}/Q_{RP}$ and $I_{RE}/Q_{RE}$—are produced from the reference GPS signal, and are processed and tracked in the conventional manner by the receiver baseband processor. As a result of the dual port configuration, the corresponding GPS signal received at the slave antenna produces three complex slave I and Q outputs —designated $I_{SL}/Q_{SL}$, $I_{SP}/Q_{SP}$ and $I_{SE}/Q_{SE}$—which are phase shifted in proportion to the absolute displacement (pointing) of the slave antenna with respect to the reference antenna tracking the same GPS satellite. That is, this proportional phase shift is derived from the slave correlators as a natural by-product of the conventional tracking of the signals produced by the reference correlators.

According to the pointing technique of the invention, the slave I and Q correlation outputs are processed along with the reference I and Q correlation outputs to obtain the GPS pointing observables for one satellite. Exemplary baseband equations which produce the pointing observables in terms of these complex I and Q correlation outputs are provided in Sections 3.2 and 3.3.

The design for the GPS single-receiver pointing embodiment provides a number of advantages over conventional multiple-receiver systems, in addition to reducing the hardware and baseband software required for continuous GPS pointing or attitude measurements. For example, since the replica carrier and code generators and the Oscillator are common to the reference and slave correlators, noise contributions from these sources cancel as common mode noise when the observables are differenced to form the pointing or attitude measurements (even if dedicated replica carrier and code generators are used, the common clock is effective in cancelling common mode noise). A high quality oscillator or an atomic standard is not needed since both long term and short term clock noise are common mode and cancel out when the GPS observables are differenced. The assignment of the role of reference antenna is arbitrary, so that the normal GPS tracking function can be switched from one antenna to another if a failure occurs in the antenna or the precorrelation electronics. This provides added redundancy for the normal GPS tracking modes even though the pointing function is disabled.

3.2. Carrier Phase Difference Measurement. For the exemplary embodiment, pointing is computed using differential carrier doppler phase processing, using the Prompt reference and slave I and Q correlation outputs.

The reference/slave carrier doppler phase difference measurement (i.e. the single path difference) is given in dimensions of degrees by:

$$\text{TAN}^{-1} ((I_{RP} * Q_{SP} - Q_{RP} * I_{SP})/(I_{RP} * I_{SP} + Q_{RP} * Q_{SP}))$$

where $I_{RP}$ and $Q_{RP}$ are respectively in-phase and quadrature Prompt correlator outputs for the reference antenna, and $I_{SP}$ and $Q_{SP}$ are respectively in-phase and quadrature slave Prompt correlator outputs for the slave antenna. Because, the carrier doppler phase difference is in terms of the Prompt I and Q correlation outputs associated with both the reference and slave GPS signals, any jitter in the reference tracking loop also appears on the slave signals, and therefore, does not have a significant adverse impact.

No special receiver baseband tracking software is required to track the GPS signal received at the slave antenna. Only the software to read and process the resulting slave I and Q correlation outputs is required.

This same process is repeated for each channel in the receiver.

Since the reference GPS signal and the slave GPS signal are essentially in phase with respect to the 50 Hz navigation message data modulation, the carrier doppler phase difference results in data cancellation. Hence the reference/slave carrier phase difference can be time averaged across data transitions without introducing error.

3.3. Code Offset Coarse Measurement. As an alternative to differential carrier doppler phase measurement, a reference/slave code phase difference measurement (i.e., the single path difference) can be obtained without ambiguity using the Early and Late reference/slave I and Q correlation outputs. However, the noise on these measurements is orders of magnitude larger than the carrier doppler phase difference measurements.

For example, if C/A code is used, the code offset measurements are typically 3000 times noisier than the carrier doppler phase difference measurements. This produces a coarse measurement that may be useful for ambiguity resolution, but in general, would result in unsatisfactory pointing or attitude measurement accuracy.

For differential pseudo range, the unknown receiver time bias is common to both the reference and slave correlations, and cancels when the difference measurement is formed. The result is an unambiguous reference/slave code delay (range) difference estimate.

The code offset is given by the following equation (normalized to the 293 meter C/A-code chip length):

$$(RLE - REE - SLE + SEE)/(RLE + REE + SLE + SEE)$$

where:
  REE = SQRT $(I_{RE}^2 + Q_{RE}^2)$
  RLE = SQRT $(I_{RL}^2 + Q_{RL}^2)$
  SEE = SQRT $(I_{SE}^2 + Q_{SE}^2)$
  SLE = SQRT $(I_{SL}^2 + Q_{SL}^2)$ and where $I_{RE}^2/Q_{RE}^2$ are in-phase and quadrature reference Early correlation outputs, $I_{RL}^2/Q_{RL}^2$ are in-phase and quadrature reference late correlation outputs, $I_{SE}^2/Q_{SE}^2$ are in-phase and quadrature slave Early correlation outputs, and $I_{SL}^2/Q_{SL}^2$ are in-phase and quadrature slave Late correlation outputs.

This code offset measurement operates analogously to the carrier doppler phase difference measurement, i.e. the measurement is developed from both reference and slave I and Q correlation outputs, so that jitter in the reference tracking loop does not have a significant adverse impact. An alternative relationship for the code offset (again, normalized to the 293 meter C/A-code chip length) is given by:

$$(1/SLOPE)*((L-E)/L+E)) = 0.5*((L-E)/(L+E))$$

where:
  L = $(I_{SL}^2 + Q_{SL}^2)^{\frac{1}{2}}$
  E = $(I_{SE}^2 + Q_{SE}^2)^{\frac{1}{2}}$
  SLOPE = 2 C/A CHIP$^{-1}$ In this case, the code offset is given in terms of only the slave I and Q correlation outputs since the reference antenna signal is tracked and the slave antenna code phase is offset; i.e., the assumption is made that the reference antenna code correlation envelope is in alignment with the incoming pseudo random noise (PRN) code of the satellite while the slave antenna code correlation envelope is skewed in direct proportion to the range offset. The code correlation error characteristic of the same PRN signal from the slave antenna is therefore equal to the code range difference.

The code offset measurement equation involving both the reference and slave antenna signals makes no assumptions, and in addition is less susceptible to jitter, and is therefore likely to be the superior of the two.

3.4. Pointing Observables. The single-receiver pointing technique eliminates the local reference clock oscillator noise, the replica carrier generator noise and the replica code generator noise, which are common mode, from the pointing observables when these observables are differenced for the same satellite.

As a result, GPS receiver hardware is simplified while maximizing the pointing accuracy achievable. It does not require the use of an atomic frequency standard to enable long term averaging of the observables. The reference and slave observables are obtained with essentially identical time alignment at the spread spectrum decorrelation levels, significantly improving the accuracy of the pointing observables when the phase differences are taken.

The principal GPS pointing observables are the digital I and Q output data from the dual set of Early, Prompt and Late correlators associated respectively with the reference and slave antennas. These observables are time tagged and identified with their respective satellite and antenna origin in the receiver baseband software.

For GPS pointing applications using interferometry techniques, the accuracy limitation is dominated by the differential carrier thermal noise error of the carrier loop observables (Prompt I and Q data), assuming that errors associated with differential multipath and differential antenna phase center migration can be made small relative to the thermal noise (see Section 3.5). The code loop observables (Early and Late I and Q data) are not used in the C/A-code exemplary receiver design because the antennas are separated by only one meter, and the error in the code loop differential observables is too large to be useful in resolving the integer-wavelength ambiguity (see Section 2.2).

The level of absolute uncertainty is established by the spherical solution shell shown in FIG. 3c, and this defines the initial level of ambiguity that must be resolved in the processing of the carrier loop differential observables, for which the carrier doppler phase repeats every 19.03 centimeters at L1. Since there is a 50 Hz data modulation on the L1 carrier, the input carrier phase is subject to a 180 degree phase reversal every 20 milliseconds and the absolute phase can be inverted. The data modulation is removed from the carrier by means of a Costas loop in the carrier tracking loop. Because the data modulation transitions are identical on the detected GPS signals from both antennas, the differencing process cancels the data phase reversals.

Figure 10A:
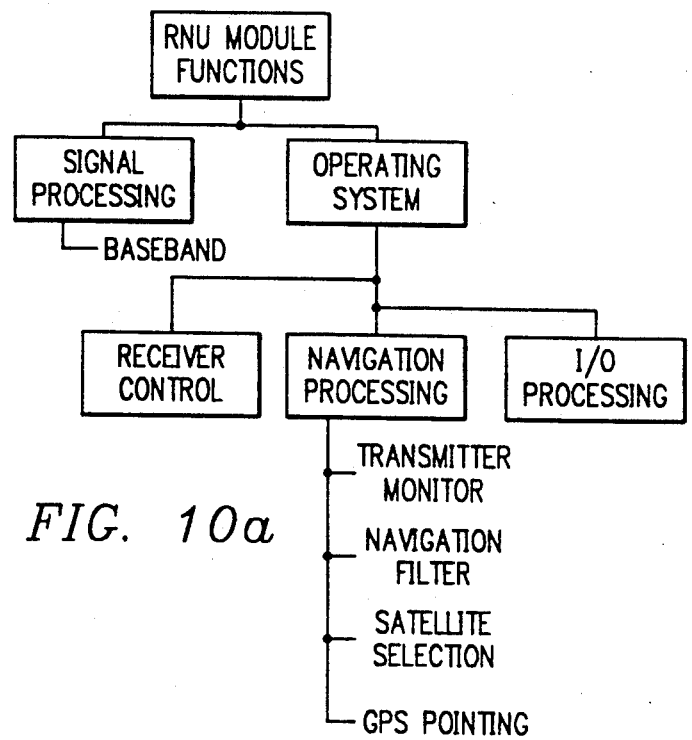
FIGS. 10a and 10b illustrate the software functions performed by the GPS single-receiver pointing/attitude system.

All the information necessary to obtain an unambiguous carrier doppler phase measurement, and to maintain an integer count of the cycles that have occurred are input to the GPS pointing function (see Section 4.5 and FIG. 10a under navigation processing). In the exemplary receiver design, the processing necessary to obtain the solution to the absolute integer cycle carrier doppler phase ambiguity, and the pointing computation is performed by an external processor, and the averaged first difference pointing observables, satellite position and user navigation state which are required for this computation are provided to the external processor via an instrumentation port. In practice, the entire pointing or attitude computation will be performed by the navigation processing function.

One advantage of having an oversolution of five satellites, is to increase the rate at which an unambiguous solution converges. Once the carrier wavelength integer count ambiguity has been resolved, absent carrier cycle slips, the solution remains converged.

The single-receiver pointing technique uses double differences of the reference and slave antenna observables to eliminate the unequal bias between the reference and slave antennas due to the unequal delay path lengths precorrelation and correlation electronics (in FIG. 5, between the RF Assembly and the input to the COAC on the Analog module). These biases are in common with all satellites tracked on each antenna, but are not in common between the two antennas. The double differencing algorithm eliminates the unequal bias, and therefore, obviates the need to calibrate it.

In the exemplary GPS receiver design, the first difference is the difference between observables from the same satellite observed from the two different antennas. The second difference is the difference between pairs of satellite first differences. In comparison, in geodetic applications, the first difference is taken between pairs of satellites tracked from the same antenna to eliminate common mode biases, and then the second difference is taken between matched pairs of first differences (algebraically, the results are identical regardless of the order the differences are taken).

3.5. Error Sources. As discussed in Section 3.4, double differencing the observables eliminates most sources of path delay and clock errors. Time skew in the measurements is the greatest source of error in this process. The design countermeasure is the common receiver clock, common carrier and common code generator per satellite tracked, which are used to decorrelate the signals from both reference and slave antennas. After double differencing, the signal error due to thermal noise has actually been increased by a factor of two, and filtering is used to reduce thermal noise error.

Other than thermal noise, the significant sources of error that must be minimized by design countermeasures are: differential multipath and differential antenna phase center migration.

Even though the exemplary receiver design minimizes the effect of differential multipath error, this source of error can be eliminated only by controlling the reflecting surfaces external to the antennas. The exemplary receiver is designed to never acquire or track the late multipath signal arrivals, however, multipath signals which cause a phase shift in one antenna to be different than in the other antenna can seriously impact the otherwise high accuracy of the differential carrier phase measurements.

These effects are temporal in nature because the satellites are in motion with respect to the multipath reflectors even if the user is stationary. Multipath is recognized by abnormal fluctuations of carrier to noise power ratio (C/No), and tends to become worse when the elevation angles to the GPS satellites are low because of more reflecting surfaces in the lower regions.

The design countermeasures for differential multipath include the use of a groundplane or a choke ring around each antenna to suppress gain at low elevation angles, the use of the oversolution that is provided by the five channels of the exemplary receiver, tracking higher elevation satellites, and/or the use of GPS antennas with sharp gain rolloff at elevation angles below 10 degrees.

Differential antenna phase center migration error is an unbalanced migration of the two antenna phase centers causing differential position error in the observations. The phase center of each antenna migrates with the change in gain characteristic as a function of look angle to the GPS satellite, and is different for each satellite tracked. Most migration problems occur near the horizon, where the antenna gain changes most dramatically.

Different design countermeasures are used. The antennas are phase matched to minimize differential error. These phase matched antennas are precisely indexed to the same reference point on each antenna, and the indices are carefully aligned on the pointing fixture. The antenna gain characteristic is made small, and is also matched, so that no net error affects the pointing vector. The higher elevation satellites are selected for tracking, and an oversolution fifth satellite is tracked—two of the design countermeasures used to minimize differential multipath effects.

4. Exemplary GPS Receiver. The exemplary GPS receiver that can be used as a GPS single-receiver pointing/attitude system according to the invention is a modified AN/PSN-9, manufactured by Texas Instruments, Inc.

FIG. 5 is a functional block diagram of an exemplary GPS receiver 100, which includes four major modules: (a) an RF Assembly 102, (b) an Analog module 104, (c) a Digital module 106, and (d) a Control/Display module 108. In addition, battery and power switching and conditioning circuits are included in a Rigidflex module 109.

The RF Assembly 102 is a dual down conversion design. There are two L1 bandpass filters 111 and 112, one before and one after the preamp 114, for complete out-of-band signal rejection. An IF bandpass filter 116 narrows the noise equivalent bandwidth to about 1.9 MHz. The two GPS navigation signals are output from the two RF modules at IF into the dual port Analog module.

The Analog module 104 includes (dual) signal conditioning amplifiers 122 of the IF GPS signals followed by (dual) one bit A/D converters 124. The A/D converters feed the (dual) input ports of each of the five COACs (Channel-On-A-Chip) 125. Thereafter, all GPS signal processing is performed with digital circuitry under the control of the GPS processor in the Digital module.

The Digital module 106 performs baseband processing, including code and carrier loop filters. A GPS processor 132 extracts GPS observables, and performs higher level functions such as navigation and I/0 processing.

4.1. Antennas. Each L1 antenna is a cross-strapped dipole contained in a protective low profile radome. The cross-strapped dipole antenna is conducive to reducing pointing error contribution due to small differential antenna phase center migration.

In addition, the reference and slave antennas are carefully indexed to ensure that they are mounted in the same orientation on the antenna structure. Thus, when mounted and aligned on the antenna structure, the antennas will point in the same direction. Since the gain rolloff (and therefore phase shift) characteristics are well matched, this significantly reduces the differential phase center migration as the elevation angles to the (up to five) GPS satellites change while acquiring pointing observables.

Figure 6:
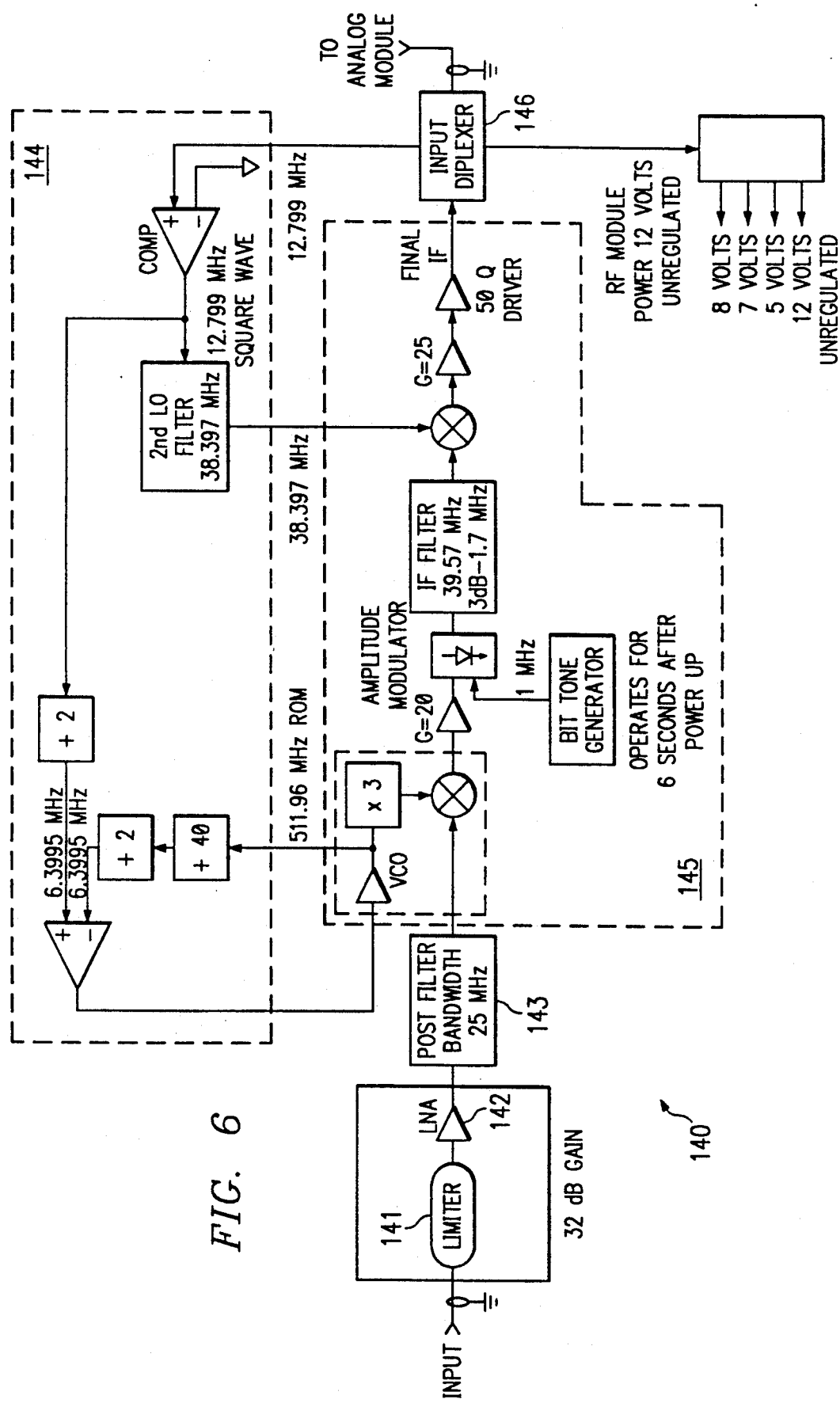
FIGS. 6–9 respectively illustrate in further functional detail the RF Assembly, Analog module, Channel-on-a-Chip (COAC) used in the Analog module and the Digital module of an exemplary GPS single-receiver pointing system.

4.2. RF Assembly. As illustrated in FIG. 6, each RF Assembly 140 receives a GPS navigation signal from a respective (reference or slave) L-band L1 antenna.

The RF Assembly performs L1 bandpass filtering using a low-insertion-loss front end limiter 141, a low-noise preamplifier 142, and a post filter. The limiter is used to protect the preamp from distortion caused by high powered, out-of-band transmitters close to the receiver. The preamp is a monolithic design featuring a 1.8 dB noise figure. The postfilter provides additional rejection of out-of-band signals, but it primarily limits the noise bandwidth and prevents noise fold-in at the first frequency down-conversion.

The L1 GPS navigation signal is converted to IF using an LO (local oscillator) synthesizer 144 and a frequency down-converter 145. The final IF output is fed into a three-way diplexer 146, along with the 12 Volt unregulated DC input and the 12.799 MHz local oscillator input, which separates the three signals appropriately.

Figure 7:
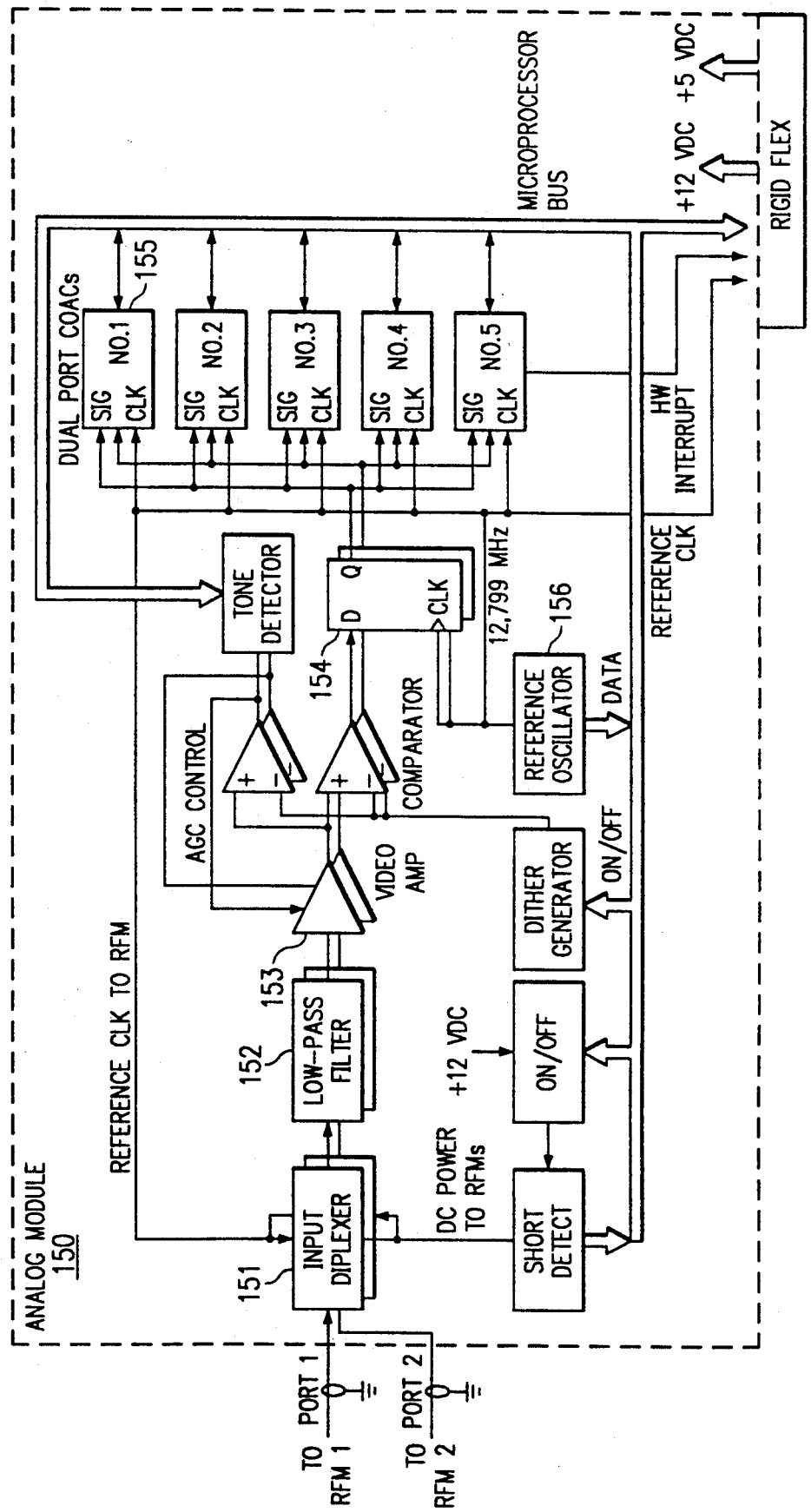

4.3. Analog Module. As illustrated in FIG. 7, the dual port Analog module 150 receives two IF signals from the two remote RF modules. The signals pass through dual input diplexers 151, low pass filters 152, video automatic gain control (AGC) amplifiers 153, A/D converters 154 and then to the five dual port C/A-Code COAC ASICs 155. The reference oscillator 156 is also mounted on the Analog Module.

The two digitized IF signals are fed into the dual inputs of all five COACs. Because A/D conversion occurs prior to correlation (generally referred to as precorrelation A/D conversion), the IF signals are still spread spectrum signals.

Figure 8:
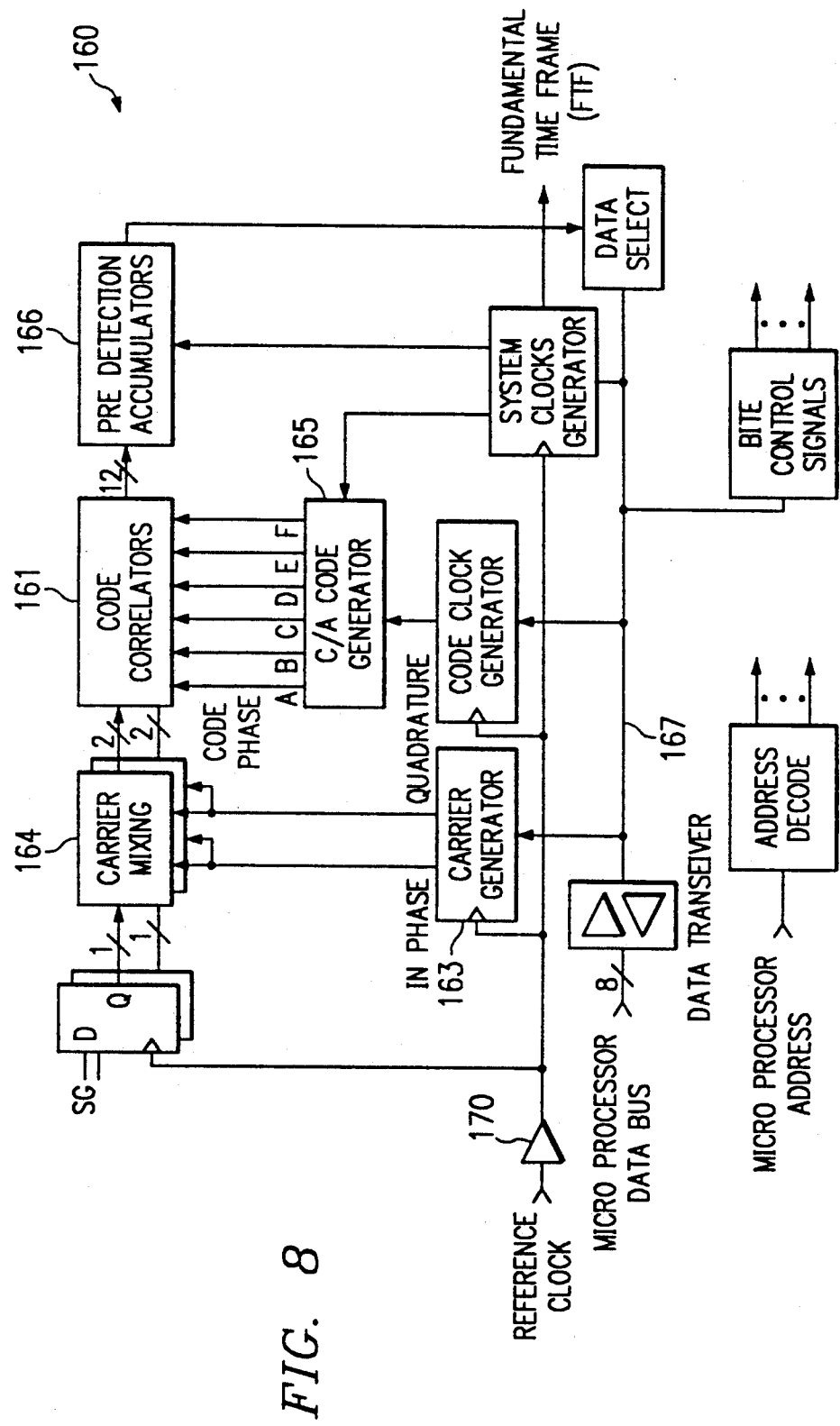

FIG. 8 is a block diagram of a COAC 160, which includes six digital code correlators 161. All six are used during search operations associated with the reference antenna, which significantly speeds up the acquisition and reacquisition functions. During pointing/tracking operations, three correlators are connected to the reference antenna signals and the remaining three are connected to the slave antenna signals.

A replica carrier generator 163 synthesizes I and Q signals which are connected to a dual carrier mixing stage 164. The outputs of the carrier mixing function are the complex I and Q signals which are input into the code correlators 161. A replica C/A-code generator 165 with six taps feeds the dual code correlators. (See, FIG. 4 and Section 3.1)

During track modes, the code phases of the first three taps are adjusted to be a half-chip Early, Prompt (or On-time) and a half-chip Late with respect to the reference antenna incoming signal. The last three taps are adjusted identically to the first three, but connected to the slave antenna incoming signal. Thus, each COAC is provided with two independent sets of code and carrier digital correlators.

The dual code correlators 161 produce pre-detection complex I and Q outputs (Early, Prompt and Late). These are accumulated by dual pre-detection accumulators 166. All the GPS receiver signal correlation and replica signal generation functions are provided by the COAC.

The microprocessor in the Digital module interfaces with each of the five COACs via a data bus 167 using memory mapped input/output (I/0) addressing to control the carrier generator 163, a code clock generator 168, a systems clocks generator 169 from the pre-detection accumulators. The microprocessor, in cooperation with the five COACs, provides the conventional five channel search and tracking functions.

In the GPS pointing application, the receiver tracks the phase center of the reference GPS antennas for up to five GPS satellites in the conventional manner, obtaining phase lock with each satellite signal from this antenna. The carrier and code replica I and Q signals are fed simultaneously to the reference as well as the slave set of I and Q correlators. The I and Q outputs of the reference correlators are output to the Digital module, formed into carrier and code error signals, input into carrier and code tracking loops, and ultimately fed back as correction signals to the COAC carrier and code replica generators in a closed loop fashion.

As described in Section 3, these same carrier and code replica generator signals are fed to the slave set of correlators whose inputs are derived from the slave antenna. The resulting second set of I and Q signals are synthesized, and rotated in phase corresponding to the phase shift caused by the difference in phase between the reference and slave GPS signals. This phase difference is the pointing observable for one GPS satellite.

A reference clock 170 uses an uncompensated free running crystal resonator with a temperature monitor. Temperature excursions are mapped to a uniquely calibrated frequency error table. The table resides in an on-board PROM, and is generated during manufacture. The error is output to the Digital module microprocessor.

Drift compensation during initial search conditions is performed by software. Knowing this error reduces the doppler search range and minimizes search time.

The receiver achieves phase lock with the satellite signals after acquisition, reads the navigation message and as a by product of the GPS navigation solution, determines the frequency drift of the reference clock 170 (time bias rate). Insulation around the resonator minimizes the rate of frequency drift as a result of a rapid change in ambient temperature. By closing the loop in software, rather than in the oscillator, undesirable "jumps" common with a conventional digitally compensated crystal oscillator, can be eliminated.

The reference clock drift does limit the carrier tracking bandwidth to about 7 Hertz, which is a much wider bandwidth than would be desirable for pointing operations using two GPS receivers with independent reference clocks. However, the same reference clock is used to synthesize both the reference and the slave set of I and Q signals, so the first difference of these signals cancels this common mode oscillator noise. Hence, accuracy performance is not limited by either the carrier tracking loop bandwidth, or by reference clock phase jitter.

Figure 9:
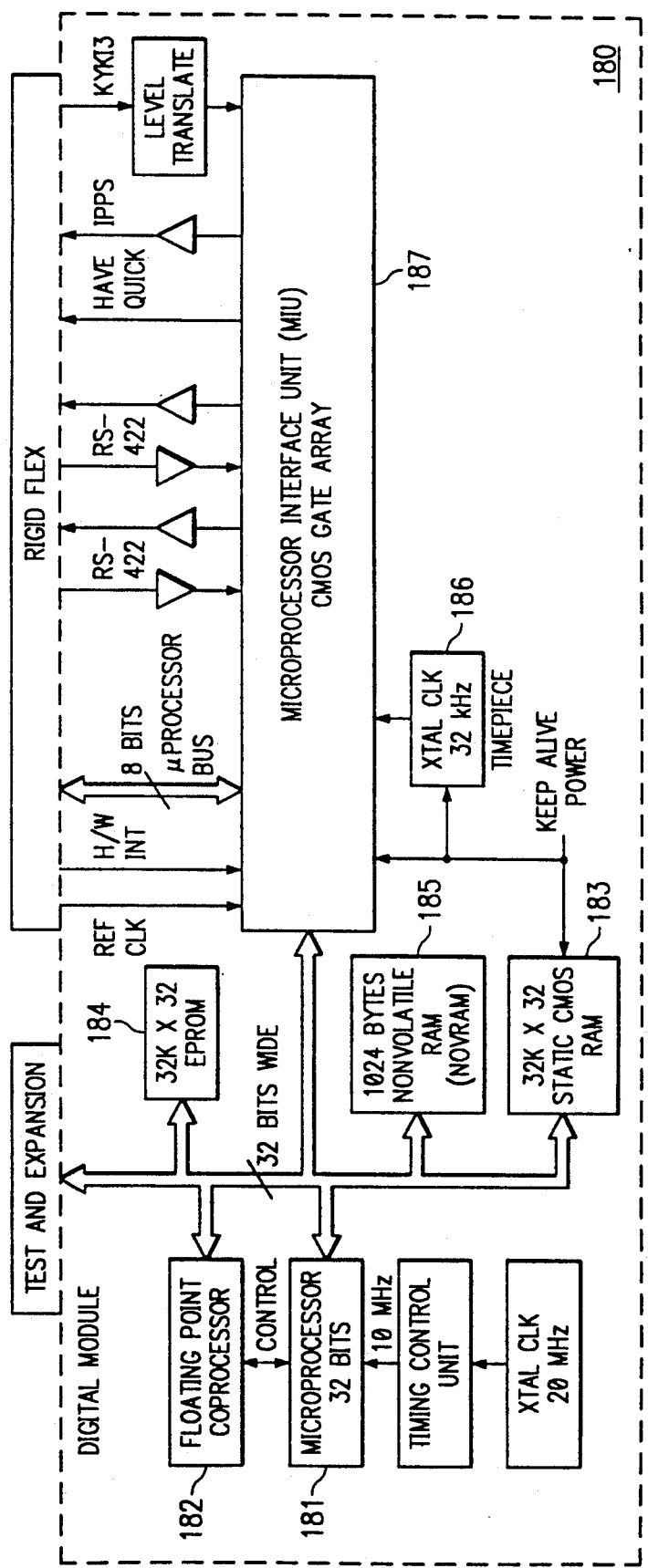

4.4. Digital Module. As illustrated in FIG. 9, the Digital module 180 includes a 32-bit microprocessor 181, floating point coprocessor 182, random access memory (RAM) 183, EPROM 184, nonvolatile RAM (NOVRAM) 185, crystal clock timepiece 186 and a special purpose microprocessor interface unit (MIU) 187 with UARTs for the two RS-422 serial pórts.

The processor memory bus and status line are made available at a connector to be used for either system expansion or as a factory test port. Other interfaces are included to communicate with the Analog module and the two serial ports. ICs on the Digital module take advantage of CMOS technology to provide low power dissipation. The board contains 128K bytes (32K of 32-bit words) of EPROM, 128K bytes of RAM and 1K byte of NOVRAM. The RAM is static CMOS wired on a separate power line and maintained in standby when the system is off. The NOVRAM is used to retain key variable parameters without requiring a battery.

Figure 10B:
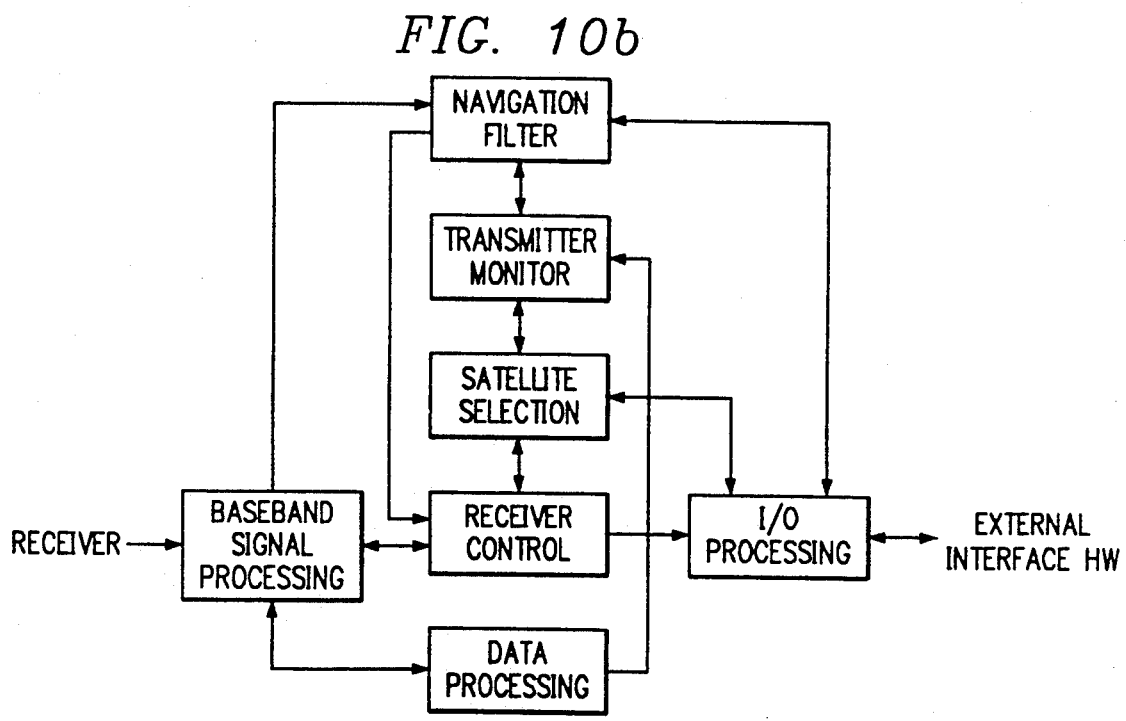

4.5. Software. The major software modules are shown in FIG. 10a. The software functional relationships are shown in FIG. 10b.

Referring to FIG. 10a, the GPS receiver is driven by two main modules: Baseband and Receiver Control.

Baseband controls the receiver hardware initialization, acquisition, reacquisition, and tracking operations. Baseband performs satellite signal processing during acquisition, reacquisition and tracking operations. Baseband provides ranging and carrier measurements, as well as demodulated satellite navigation message data. It also provides the first difference carrier doppler phase measurements from the reference and slave antenna signals, which are eventually used to perform pointing.

Five hardware channels are used for continuous tracking of L1 C/A-Code for the assigned GPS satellites. The Receiver Control module provides the search strategies for sky search (the process of searching for satellites when there is insufficient or no initialization data provided), normal acquisition (the process of searching when sufficient initialization data is provided either by the operator or from the built-in clock and the data retained in non-volatile memory from previous operation) and reacquisition. The Receiver Control then directs the Baseband mode progressions and fallbacks. It also selects the loop bandwidths and loop orders for Baseband processing during the tracking modes.

The Navigation software performs satellite selection, transmitter monitor (maintenance and processing of the satellite navigation messages and computation of satellite positions and velocities), and the navigation filter algorithms. In addition, the Navigation software aids receiver acquisitions or reacquisitions while continually updating the navigation state vector at a one second rate.

5. Conclusion. Although the invention has been described with respect to a specific, exemplary embodiment, various changes and modifications may be suggested to one skilled in the art, and it is intended that the invention encompass such changes and modifications as fall within the scope of the appended claims.

What is claimed is:

1. A GPS pointing and attitude measurement system using a single GPS receiver and multiple antennas to derive pointing and attitude measurement using a selected PRN code recovered from GPS navigation signals, wherein azimuth and elevation are determined in pointing application and roll, pitch, and yaw are determined in attitude application, comprising:

a reference and at least one slave antenna mounted to a foundation, such that the separation is significantly less than the correlation interval for the selected PRN code;

reference and, for each slave antenna, slave precorrelation electronics for providing respective digital representations of the GPS signals received by said reference and slave antennas;

at least one replica carrier generator for generating a replica of the GPS carrier signal;

at least one replica code generator for generating a replica of the selected GPS PRN code signal;

reference correlation electronics, including a carrier mixer and a selected number of code correlators, responsive to the reference GPS signal, and to replica carrier and replica code signals, for generating reference I and Q correlation outputs;

for each slave antenna, slave correlation electronics including a carrier mixer and at least one code correlator responsive to the slave GPS signals, and to replica carrier and replica code signals, for generating slave I and Q correlation outputs; and a GPS processor responsive to the reference I and Q correlation outputs for tracking with the reference antenna, and responsive to the reference and slave I and Q correlation outputs for computing pointing and attitude measurements.

2. The GPS single-receiver pointing and attitude system of claim 1, wherein the selected PRN code is C/A-code.

3. The GPS single-receiver pointing and attitude system of claim 1, wherein the selected PRN code is P-code.

4. The GPS single-receiver pointing and attitude system of claim 1, wherein pointing and attitude measurements are computed from differential carrier doppler phase measurements.

5. The GPS single-receiver pointing and attitude system of claim 4, wherein the carrier doppler phase measurement is computed using reference and slave prompt I and Q correlation outputs.

6. The GPS single-receiver pointing and attitude system of claim 5, wherein pointing and attitude measurements are based on computations of carrier phase differences between said reference and slave antennas according to the relationship:

$$TAN^{-}((I_{RP}*Q_{SP} - Q_{RP}*I_{SP})/(I_{RP}*I_{SP} + Q_{RP}*Q_{SP}))$$

where $I_{RP}$ and $Q_{RP}$ are respectively in-phase and quadrature prompt correlator outputs for the reference antenna, and $I_{SP}$ and $Q_{SP}$ are respectively in-phase and quadrature prompt correlator outputs for the slave antenna.

7. The GPS single-receiver pointing and attitude system of claim 6, wherein differential code phase measurements are used as a coarse measurement for ambiguity resolution.

8. The GPS single-receiver pointing and attitude system of claim 1, wherein said reference correlation electronics includes early, prompt and late code correlators.

9. The GPS single-receiver pointing and attitude system of claim 8, wherein at least one additional code correlator is used for search/ acquisition operations, and after tracking is established with the reference antenna, said additional correlator is assigned to said slave correlation electronics.

10. The GPS single-receiver pointing and attitude system of claim 8, wherein said slave correlation electronics includes early, prompt and late code correlators, and wherein pointing and attitude measurements are computed from differential code phase measurements.

11. The GPS single-receiver pointing and attitude system of claim 10, wherein the pointing and attitude measurements are computed from the early and late reference and slave I and Q correlation outputs.

12. The GPS single-receiver pointing and attitude system of claim wherein the differential code phase measurements are computed according to the relationship:

$$(RLE - REE - SLE + SEE)/(RLE + REE + SLE + SEE)$$

where
$REE = SQRT\ (I_{RE}^2 + Q_{RE}^2)$
$RLE = SQRT\ (I_{RL}^2 + Q_{RL}^2)$
$SEE = SQRT\ (I_{SE}^2 + Q_{SE}^2)$
$SLE = SQRT\ (I_{SL}^2 + Q_{SL}^2)$
and where $I_{RE}^2/Q_{RE}^2$ are in-phase and quadrature reference Early correlation outputs, $I_{RL}^2/Q_{RL}^2$ are in-phase and quadrature reference late correlation outputs, $I_{SE}^2/Q_{SE}^2$ are in-phase and quadrature slave Early correlation outputs, and $I_{SL}^2/Q_{SL}^2$ are in-phase and quadrature slave Late correlation outputs.

13. The GPS single-receiver pointing and attitude system of claim 10, wherein the pointing and attitude measurements are computed from the early and late slave I and Q correlation outputs.

14. The GPS single-receiver pointing and attitude system of claim 13, wherein the differential code phase measurements are computed according to the relationship:

$$(1/SLOPE)^*((L-E)/L+E)) = 0.5^*((L-E)/(L+E))$$

where:
$L = (I_{SL}^2 + Q_{SL}^2)^{\frac{1}{2}}$
$E = (I_{SE}^2 + Q_{SE}^2)^{\frac{1}{2}}$
$SLOPE = 2\ C/A\ CHIP^{-1}$
and where $I_{SE}^2/Q_{SE}^2$ are in-phase and quadrature slave early correlation outputs, and $I_{SL}^2/Q_{SL}^2$ are in-phase and quadrature slave late correlation outputs.

15. The GPS single-receiver pointing and attitude system of claim 1, wherein a single set of replica carrier and code generators is used in common in generating both the reference and slave I and Q correlation outputs.

16. The GPS single-receiver pointing and attitude system of claim 1, wherein each antenna includes an index, such that the antennas can mounted to said foundation with a selected relative orientation to minimize antenna phase center migration errors.

17. The GPS single-receiver pointing and attitude system of claim 1, further comprising external sensors are used to provide pointing vector boundary conditions to facilitate ambiguity resolution.

18. The GPS single-receiver pointing and attitude system of claim 1, further comprising, for each slave antenna, an intermediate slave antenna mounted asymmetrically with respect to the slave antenna, and an antenna switching circuit, such that said slave precorrelation and correlation electronics are switched between the slave and intermediate antennas to facilitate ambiguity resolution.

19. The GPS single-receiver pointing and attitude system of claim 1, wherein the GPS receiver is a P-code receiver that tracks both the L1 and L2 GPS signals, producing two different standing wave patterns that facilitate ambiguity resolution and which can be used to correct for differential multi-path error.

20. The GPS single-receiver pointing and attitude system of claim 1, wherein a single slave antenna is mounted on said foundation, and wherein the resulting reference and slave I and Q correlation outputs are used to compute pointing measurements.

21. The GPS single-receiver pointing and attitude system of claim 20, wherein said reference and slave antennas are mounted on a pointing fixture beam with a separation of about 1–5 meters.

22. The GPS single-receiver pointing and attitude system of claim 20, wherein at least one additional slave antenna is mounted co-linearly on said foundation, and wherein the resulting reference and slave I and Q correlation outputs are used to compute pointing measurements with an oversolution.

23. The GPS single-receiver pointing and attitude system of claim 1, wherein two slave antennas are mounted non-co-linearly on a planar foundation, and wherein the resulting reference and slave I and Q correlation outputs are used to compute attitude measurements.

24. The GPS single-receiver pointing and attitude system of claim 23, wherein at least one additional slave antenna mounted to the foundation, and wherein the resulting reference and slave I and Q correlation outputs are used to compute attitude measurements with an oversolution.

25. A GPS pointing and attitude measurement method using a single GPS receiver and multiple antennas to derive pointing and attitude measurements using a selected PRN code recovered from GPS navigation signals, wherein azimuth and elevation are determined in pointing applications and roll, pitch and yaw are determined in attitude applications, comprising the steps:
mounting a reference and at least one slave antenna mounted to a foundation, such that the separation is significantly less than the correlation interval for the selected PRN code;
for the reference antenna, establishing a reference antenna tracking loop to generate reference I and Q correlation outputs using a set of reference code correlators and the selected PRN code signals;
for each slave antenna, generating slave I and Q correlation outputs using at lest one slave code correlator and the selected PRN code signals; and
processing the reference and slave I and Q correlation outputs to compute pointing and attitude measurements.

26. The GPS single-receiver pointing and attitude method of claim 25, wherein the selected PRN code is C/A-code.

27. The GPS single-receiver pointing and attitude method of claim 24, wherein the selected PRN is P-code.

28. The GPS single-receiver pointing and attitude method of claim 25, wherein pointing and attitude measurements are computed from differential carrier doppler phase measurements.

29. The GPS single-receiver pointing and attitude method of claim 28, wherein the carrier doppler phase measurement is computed using reference and slave prompt I and Q correlation outputs.

30. The GPS single-receiver pointing and attitude method of claim 29, wherein pointing and attitude measurements are based on computing carrier phase differences between said reference and slave antennas according to the relationship:

$$TAN^{-1}((I_{RP}*Q_{SP}-Q_{RP}*I_{SP})/(I_{RP}*I_{SP}+Q_{RP}*Q_{SP}))$$

where $I_{RP}$ and $Q_{RP}$ are respectively in-phase and quadrature prompt correlator outputs for the reference antenna, and $I_{SP}$ and $Q_{SP}$ are respectively in-phase and quadrature prompt correlator outputs for the slave antenna.

31. The GPS single-receiver pointing and attitude method of claim 30, further comprising the step of using differential code phase measurements as a coarse measurement for ambiguity resolution prior to computing pointing and attitude.

32. The GPS single-receiver pointing and attitude method of claim 25, wherein pointing and attitude measurements are computed from differential code phase measurements using early and late reference and slave correlation outputs.

33. The GPS single-receiver pointing and attitude method of claim 32, wherein the differential code phase measurements are computed according to the relationship:

$$(RLE-REE-SLE+SEE)/(RLE+REE+SLE+SEE)$$

where:
  $REE = SQRT\ (I_{RE}^2 + Q_{RE}^2)$
  $RLE = SQRT\ (I_{RL}^2 + Q_{RL}^2)$
  $SEE = SQRT\ (I_{SE}^2 + Q_{SE}^2)$
  $SLE = SQRT\ (I_{SL}^2 + Q_{SL}^2)$ and where $I_{RE}^2/Q_{RE}^2$ are in-phase and quadrature reference Early correlation outputs, $I_{RL}^2/Q_{RL}^2$ are in-phase and quadrature reference late correlation outputs, $I_{SE}^2/Q_{SE}^2$ are in-phase and quadrature slave Early correlation outputs, and $I_{SL}^2/Q_{SL}^2$ are in-phase and quadrature slave Late correlation outputs.

34. The GPS single-receiver pointing and attitude method of claim 31, wherein the pointing and attitude measurements are computed using early and late slave I and Q correlation 35. The GPS single-receiver pointing and attitude method of claim 34, wherein the differential code phase measurements are computed according to the relationship:

$$(1/SLOPE)*((L-E)/L+E)) = 0.5*((L-E)/(L+E))$$

where:
  $L = (I_{SL}^2 + Q_{SL}^2)^{\frac{1}{2}}$
  $E = (I_{SE}^2 + Q_{SE}^2)^{\frac{1}{2}}$
  $SLOPE = 2\ C/A\ CHIP^{-1}$ and where $I_{SE}^2/Q_{SE}^2$ are in-phase and quadrature slave early correlation outputs, and $I_{SL}^2/Q_{SL}^2$ are in-phase and quadrature slave late correlation outputs.

36. The GPS single-receiver pointing and attitude method of claim 25, wherein the reference and slave I and Q correlation outputs are generated using a single set of replica carrier and code signals.

37. The GPS single-receiver pointing and attitude method of claim 25, wherein a single slave antenna is used, and wherein the resulting reference and slave I and Q correlation outputs are processed to compute pointing measurements.

38. The GPS single-receiver pointing and attitude method of claim 37, wherein at least one additional slave antenna is mounted on said foundation co-linearly, and wherein the resulting reference and slave correlation outputs are used to compute pointing measurements with an oversolution.

39. The GPS single-receiver pointing and attitude method of claim 25, wherein two slave antennas are mounted non-co-linearly on a planar foundation, and wherein the resulting reference and slave I and Q correlation outputs are processed to compute attitude measurements.

40. The GPS single-receiver pointing and attitude method of claim 39, wherein at least one additional slave antenna is mounted to the foundation, and wherein the resulting reference and slave I and Q correlation outputs are processed to compute attitude measurements with an oversolution.

* * * * *